United States Patent
Shampine et al.

(10) Patent No.: US 12,264,078 B2
(45) Date of Patent: Apr. 1, 2025

(54) LITHIUM RECOVERY THERMAL MANAGEMENT

(71) Applicant: Schlumberger Technology Corporation, Sugar Land, TX (US)

(72) Inventors: Rod William Shampine, Sugar Land, TX (US); Gary W. Sams, Houston, TX (US); Miguel Angel Lopez, Sugar Land, TX (US); Prasanna Nirgudkar, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/293,532

(22) PCT Filed: Aug. 1, 2022

(86) PCT No.: PCT/US2022/039015
§ 371 (c)(1),
(2) Date: Jan. 30, 2024

(87) PCT Pub. No.: WO2023/009887
PCT Pub. Date: Feb. 2, 2023

(65) Prior Publication Data
US 2024/0336490 A1 Oct. 10, 2024

Related U.S. Application Data

(60) Provisional application No. 63/203,773, filed on Jul. 30, 2021.

(51) Int. Cl.
*C01D 15/02* (2006.01)
*C02F 1/28* (2023.01)
*C02F 101/20* (2006.01)

(52) U.S. Cl.
CPC .............. *C01D 15/02* (2013.01); *C02F 1/28* (2013.01); *C02F 2101/20* (2013.01)

(58) Field of Classification Search
CPC ......... C01D 15/02; C02F 1/28; C02F 2101/20
(Continued)

(56) References Cited

U.S. PATENT DOCUMENTS 4,291,001 A 9/1981 Repsher
4,727,936 A 3/1988 Mioduszewski
(Continued)

FOREIGN PATENT DOCUMENTS

CN 1511964 A 7/2004
CN 104313348 A 1/2015
(Continued)

OTHER PUBLICATIONS

Refrigeration, https://energyrecovery.com/refrigeration/, downloaded on Aug. 14, 2021 (5 pages).
(Continued)

*Primary Examiner* — Melissa S Swain
(74) *Attorney, Agent, or Firm* — Jeffrey D. Frantz

(57) ABSTRACT

An energy efficient and environmentally benign lithium recovery process is described. The process comprises extracting lithium from the brine source using a ion withdrawal process to form a lithium extract; providing electricity for the extracting using an energy source; and recovering thermal energy from the energy source for use in the extracting.

9 Claims, 6 Drawing Sheets

(58) Field of Classification Search
USPC .......................................................... 423/641
See application file for complete search history.

(56) References Cited

U.S. PATENT DOCUMENTS

| | | | |
|---|---|---|---|
| 5,681,477 A * | 10/1997 | Leavitt | C01D 15/00 210/678 |
| 5,833,844 A | 11/1998 | Leavitt | |
| 6,073,448 A | 6/2000 | Lozada | |
| 9,068,247 B2 | 6/2015 | Marston | |
| 9,976,417 B2 | 5/2018 | Mahavadi | |
| 10,018,590 B2 | 7/2018 | Mahavadi | |
| 11,169,114 B2 | 11/2021 | Mahavadi | |
| 11,298,658 B2 | 4/2022 | Wohlert | |
| 11,365,128 B2 | 6/2022 | Marston | |
| 11,941,128 B2 | 3/2024 | Andersen | |
| 2003/0132113 A1 | 7/2003 | Sarme | |
| 2006/0163069 A1 | 7/2006 | Prak | |
| 2009/0269767 A1 | 10/2009 | Soderlund | |
| 2010/0068605 A1 | 3/2010 | Harris | |
| 2011/0174739 A1 | 7/2011 | Chung | |
| 2013/0205778 A1 | 8/2013 | Hansen | |
| 2014/0048485 A1 | 2/2014 | Jacobs | |
| 2014/0076734 A1 | 3/2014 | Calvo | |
| 2014/0239224 A1 | 8/2014 | Burba | |
| 2015/0114837 A1 | 4/2015 | Mahavadi | |
| 2015/0197830 A1 | 7/2015 | Chon | |
| 2017/0045476 A1 | 2/2017 | Mahavadi | |
| 2017/0102370 A1 | 4/2017 | Alber | |
| 2018/0016153 A1 | 1/2018 | Sharma | |
| 2018/0147532 A1 | 5/2018 | Switzer | |
| 2018/0245180 A1 | 8/2018 | Cheng | |
| 2019/0120791 A1 | 4/2019 | Al-Gouhi | |
| 2019/0226336 A1 | 7/2019 | Benson | |
| 2019/0248667 A1 | 8/2019 | Featherstone | |
| 2020/0047124 A1 | 2/2020 | Bhave | |
| 2020/0086271 A1 | 3/2020 | Harrison | |
| 2020/0299805 A1 | 9/2020 | Mceachern | |
| 2020/0316557 A1 | 10/2020 | Boualleg | |
| 2021/0086400 A1 | 3/2021 | Andersen | |
| 2022/0055910 A1 | 2/2022 | Jariwala | |
| 2023/0032153 A1 | 2/2023 | Sams | |
| 2023/0086861 A1 | 3/2023 | Perroni | |
| 2023/0088458 A1 | 3/2023 | Sams | |

FOREIGN PATENT DOCUMENTS

| | | |
|---|---|---|
| JP | 2011032151 A | 2/2011 |
| JP | 2018172775 A | 11/2018 |
| RU | 2688593 C1 | 5/2019 |
| WO | 2006103312 A1 | 10/2006 |
| WO | 2012044163 A1 | 4/2012 |
| WO | 2018081506 A1 | 5/2018 |
| WO | 2018183555 A1 | 10/2018 |
| WO | 2018190754 A2 | 10/2018 |
| WO | 2019221932 A1 | 11/2019 |
| WO | 2022040630 A1 | 2/2022 |
| WO | 2022203706 A1 | 9/2022 |
| WO | 2023009888 A1 | 2/2023 |
| WO | 2023022627 A1 | 2/2023 |
| WO | 2023177994 A1 | 9/2023 |
| WO | 2023183546 A1 | 9/2023 |

OTHER PUBLICATIONS

Ferrara et al., (2015) A Small Power recovery expander for heat pump COP improvement, Energy Procedia 81 (015) 1151-1159.
Turbomachine expander offers efficient, safe strategy for heating, cooling, https://www.purdue.edu/newsroom/releases/2020/Q1/turbomachine-expander-offers-efficient,-safe-strategy-for-heating,-cooling.html, downloaded on Aug. 15, 2021 (5 pages).
Turkia, et al., Online Capillary Electophoresis for Monitoring Carboxylic Acid Production by Yeast during Bioreactor Cultivations, Anal. Chem. 2013, 85, 9705-97.

* cited by examiner

LITHIUM RECOVERY THERMAL MANAGEMENT

CROSS-REFERENCE TO RELATED APPLICATIONS

This patent application is a National Stage Entry of International Application No. PCT/US2022/039015, filed Aug. 1, 2022, which claims benefit of U.S. Provisional Patent Application Ser. No. 63/203,773 filed Jul. 30, 2021, which is entirely incorporated herein by reference.

FIELD

This patent application describes methods and apparatus for lithium recovery from aqueous sources. Specifically, processes and apparatus for minimizing thermal and environmental burden of lithium recovery plants is described.

BACKGROUND

Lithium is a key element in energy storage. Electrical storage devices, such as batteries, supercapacitors, and other devices commonly use lithium to mediate the storage and release of chemical potential energy as electrical current. As demand for renewable, but non-transportable, energy sources such as solar and wind energy grows, demand for technologies to store energy generated using such sources also grows.

According to the United States Geological Survey, global reserves of lithium total 21 million tons (metric) of lithium content, with Chile, Australia, Argentina, and China accounting for about 82% of global reserves. U.S. Geological Survey, Mineral Commodity Summaries, January 2021. Global production of lithium content was 82 kT in 2020 and 86 kT in 2019. Global consumption was estimated at 56 kT in both 2019 and 2020. Id. By one estimate, global lithium demand is expected to reach 1.79 MTa of lithium carbonate equivalent, which is approximately 339 kTa of lithium content, by 2030 for an average annual growth in demand of approximately 22%. Supply is currently forecast to run behind demand, with lithium prices expected to triple by 2025, by some estimates. The incentive for more lithium production could not be clearer.

The mining industry has numerous techniques for the extraction of lithium from mineral or saline waters. Hard rock mining with acid digestion is common, but labor intensive. Methods currently used for salar lakes involve evaporation ponds with chemical additives to selectively precipitate the lithium. This process requires months to complete and typically recovers roughly 50-60% of the original lithium.

In recent years, companies are investigating improved methods to recover lithium directly from salar lakes that avoid pond evaporation, are faster and have high lithium yield. Many techniques use adsorbents that selectively recover lithium, followed by a wash step that liberates the lithium for further processing. Solid and liquid adsorbents are used. Processing brine streams involves handing large volumes of water to access the lithium contained in the brine.

Lithium recovery processes can be energy intensive and environmentally burdensome. For example, processes that use adsorbents to recover lithium from aqueous streams can benefit from operating at higher temperatures. Increasing raw brine temperature during an adsorption process will have a strong effect on the speed at which such a process occurs and may also effect the overall yield of the process. This increased speed can lead to reduced need for either processing time or adsorption materials. In some cases, the lithium source brine occurs naturally at low temperatures, so raising the temperature for lithium recovery can deliver large improvement in yield. For example, a lithium-containing brine available at 15° F. requires more energy to prepare than the same brine available at 67° F. or 100° F. A reduction in initial cost related to reduced processing time or reduced quantity of adsorption materials will facilitate a reduction in vessel volumes and play acreage. However, this improvement in time or capital cost requires increased energy to operate at higher temperatures.

Raising the temperature of the aqueous stream can be costly, because the aqueous feed to a lithium recovery facility can be the largest mass flow of the facility in some cases. The cost of the hardware itself to perform such heating can be significant. Further, recovering this heat energy after processing requires large scale heat transfer equipment. A similar increase in temperature during a stripping operation has a similar effect on the speed and may also effect the overall yield of the process. In this case, the operating cost of the heat can be one or more orders of magnitude lower than what is needed in the case of the feed stream due to the smaller mass flows. Similarly, the capital cost of the hardware is typically lower in this case.

Another concern with increasing temperature is the materials of construction. In the case of corrosion resistant plastic construction, a material like polyvinyl chloride can offer significant economy and ease of assembly, but is quite limited in its ability to handle temperature. Chlorinated polyvinyl chloride plastic allows a significant increase in operating temperature at a modest increase in price and no change in assembly. Moving to polypropylene to get a further modest increase in temperature handling significantly increases the difficulty of assembly due to the need for fusion welding, and the supply of valves is much more limited. Reduction of energy consumption and environmental burden of lithium recovery facilities involves both significant opportunity and significant complexity due to the inter-relationships of the systems. Lithium recovery processes with energy consumption and environmental burden that can be minimized by utilizing interdependent environmental mitigation and energy optimization are needed.

SUMMARY

Embodiments described herein provide a method of recovering lithium from a brine source, comprising extracting lithium from the brine source using a sorption/desorption process to form a lithium extract; providing electricity for the extracting using an energy source; and recovering thermal energy from the energy source for use in the extracting.

Other embodiments described herein provide a method of recovering lithium from a brine source, comprising extracting lithium from the brine source using an ion withdrawal process to form a lithium extract; and using thermal energy of the brine source in extracting the lithium.

Other embodiments described herein provide a method comprising extracting lithium from a brine source using an ion withdrawal process to form a lithium extract; converting lithium from the lithium extract to a lithium product using a conversion process; and providing thermal and electrical energy for the extracting and the converting using a plurality of modular, dynamically scalable energy sources.

DETAILED DESCRIPTION

Figure 1:
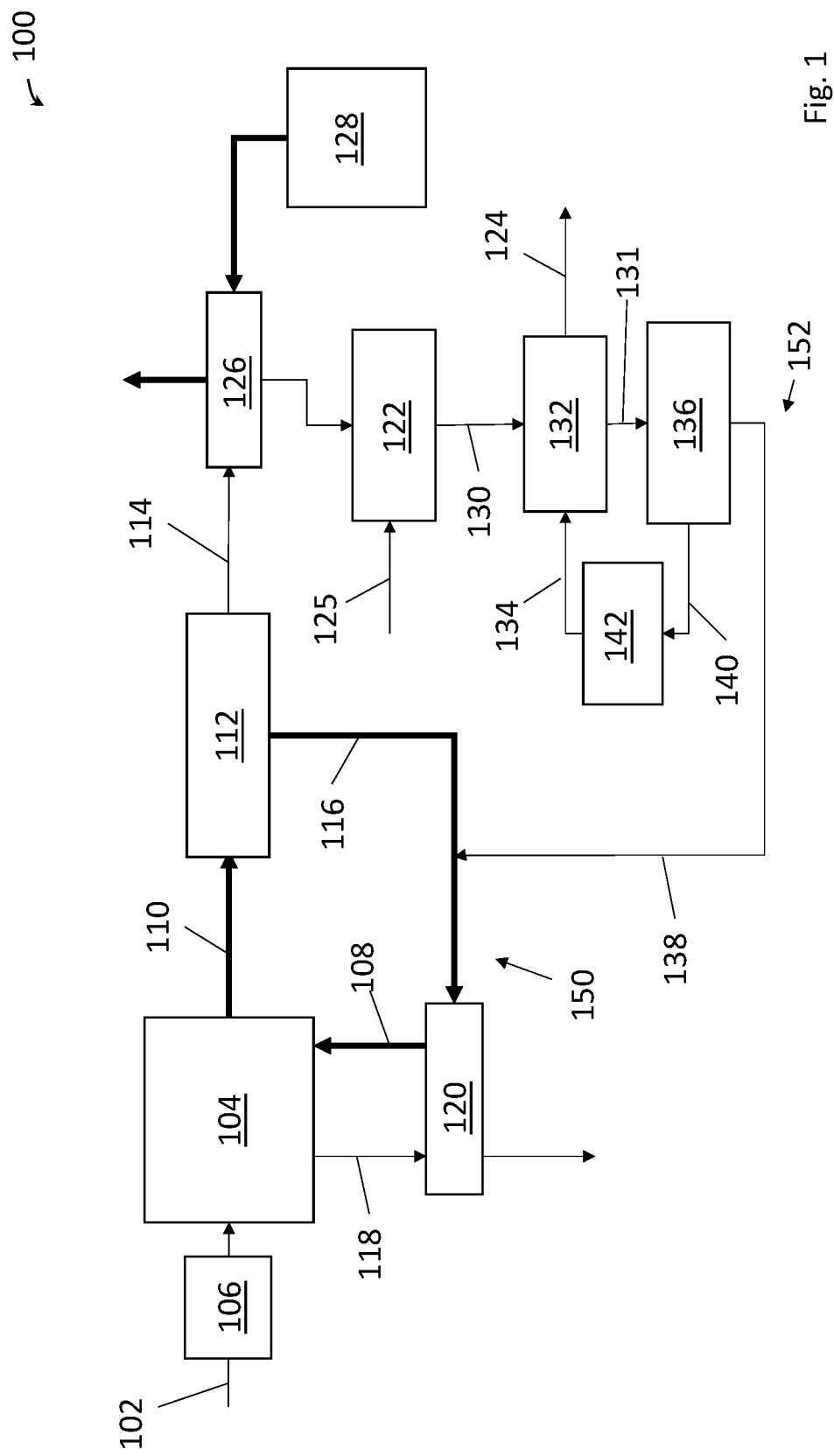
FIG. 1 is a process diagram summarizing a lithium recovery process according to one embodiment.

FIG. 1 is a process diagram summarizing a lithium recovery process 100 according to one embodiment. The process 100 recovers lithium from a brine source 102. The brine source 102 is shown here as a well, but could be any surface or subterranean brine source, or a brine source made from surface or subterranean lithium-bearing materials. Salar lakes, produced water from mines, and lithium-bearing minerals washed with water or brine streams are examples.

Lithium is extracted from the brine source 102 using an ion withdrawal process, such as a sorption/desorption process 104. The sorption process can be adsorption, absorption, or a combination thereof, and typically uses a lithium-selective medium to separate lithium from the brine source 102. The medium withdraws lithium from the aqueous stream, which is returned to the environment depleted of lithium. The process of withdrawing lithium from the aqueous stream is an ion withdrawal process wherein lithium ions, and lower amounts of other ions, are withdrawn from the aqueous solution into the medium, either at the surface of a solid medium, into the interior of a solid medium, or into a liquid medium. The brine source 102 is typically heated to a target temperature to encourage separation of lithium to the medium from the brine source 102.

In this case the brine source 102 is heated using an electric heater 106. An electric heater 106 is used here because power can be generated locally for the electric heater 106, and the power generation waste heat can be integrated to other parts of the process 100. Use of multiple forms of energy in this way provides efficient energy coupling to the process 100 for minimal energy use and cost. Releasing excess thermal energy from the process 100 to the environment adds to the cost and the environmental burden of the process, so excess thermal energy is transferred from streams used to generate electricity for the electric heater 106 into other parts of the process 100 to be described below.

An eluent stream 108 is provided to the sorption/desorption process 104 to perform the desorption of lithium from the medium. A lithium extract stream 110 exits the sorption/desorption process 104. The lithium extract stream 110 is routed to a concentrator 112. The concentrator 112 separates water from lithium in the lithium extract stream 110, producing a lithium concentrate stream 114. The concentrator 112 applies energy to the lithium extract stream 110 to perform the separation. The energy may be applied in the form of thermal energy, if the concentrator 112 is an evaporator, or in the form of pressure, for example using a pump, if the concentrator 112 is a membrane separation process. The concentrator 112 produces an aqueous removed stream 116 that is recycled to the eluent stream 108.

The sorption/desorption process 104 extracts lithium from the brine source 102, yielding a lithium depleted brine 118, which is returned to the environment, for example by injection or infiltration, after processing to remove any impurities, for example in a filtration process. Thermal energy may also be recovered from the lithium depleted brine 118 such that the stream returned to the environment has thermal energy and composition that minimizes burden on the environment. The thermal energy is recovered, in this case, using a heat exchanger or a heat pump 120 that transfers thermal energy from the lithium depleted brine 118 to the aqueous removed stream 116 so that the eluent stream 108 is at a target temperature for lithium uptake. In this way, water is circulated between the sorption/desorption process 104 and the concentrator 112 in a loop, and is used to recover thermal energy for efficient processing.

The lithium concentrate stream 114 is routed to a conversion process 122 that converts lithium into a usable lithium product 124, which can be a lithium salt such as lithium carbonate or lithium hydroxide, which may be hydrated. The conversion process 122 utilizes reagents 125 that react with dissolved lithium salts to precipitate anions dissolved in the lithium concentrate stream 114. To maximize retention of lithium in solution after the conversion, the lithium concentrate stream 114 can be heated to a target temperature using a heat exchanger 126. Hot exhaust from an energy source 128, which can be used to provide electricity to the electric heater 106, can be used to supply heat to the heat exchanger 126. The energy source 128 can be a power plant to provide power to the electric heater 106. It should be noted that instead of, or in addition to, an electric heater 106, a heat exchanger can be used, and the energy source 128 could be a furnace to generate thermal energy, which could be used to heat the brine source 102 as well as the lithium concentrate stream 114. Alternately, waste heat from the energy source 128 could be recovered and applied using a heat exchanger instead of, or in addition to, the electric heater 106.

The conversion process 122 generally forms one or more converted lithium streams 130, from which water is removed to form the product 124 using a water removal process 132. The water removal process 132 may use one or more vaporizers and a warm dry gas 134 to remove water from the converted lithium streams 130. Humid gas 131 from the water removal process 132 can be condensed in a condenser 136 to recover a conversion water stream 138 and a dry gas stream 140. The CGE humidification-dehumidification process available from Gradiant Corp. of Chennai, India, can be used for water removal at this stage. The dry gas stream 140 can be warmed in a heater 142, which may be a heat pump that can source heat from the hot exhaust of the energy source 128, for return to the water removal process 132. Alternately, the water removal process 132 can directly separate water using a membrane separation process. The conversion water stream 138 is returned to the sorption/desorption process 104 in the aqueous stream 116 for conditioning in the heat pump 120 and use in the eluent stream 108.

Where membrane separation processes are used in the process 100, for example optionally in the concentrator 112 and/or in the water removal process 132, feed streams to the membrane process are typically pressurized by pumping. Power for the pumping can be sourced from the energy source 128, if the energy source 128 produces electric power. It should be noted that where there is a mixture of thermal energy demand and electricity demand in the process 100, defined by design choices regarding what forms of energy are used, the energy source 128 can provide a variable mixture of thermal energy and electric output, for example by using more or less thermal energy-generating means to generate electricity. In some cases, a mixture of combustion generation and solar generation could be used to decouple, to some extent, thermal energy and electric generation. In this way, electric output and thermal energy output can, to some degree, be varied independently as the demands of the process 100 vary.

As the eluent stream 108, lithium extract stream 110, and aqueous stream 116 form a water loop between the sorption/desorption process 104 and the concentrator 112, the lithium concentrate stream 114, converted lithium streams 130, humid gas 131, and conversion water stream 138 form a water loop from the sorption/desorption process 104, through the concentrator 112, exchanger 126, conversion process 122, and water removal process 132. Thus, each major sub-process of the lithium recovery process 100, namely the sorption/desorption process 104 and the conversion process 122, has a corresponding water loop to minimize water burden. The eluent stream 108, lithium extract stream 110, and aqueous stream 116 form a first water loop 150 that circulates around the sorption/desorption process 104, while the lithium concentrate stream 114, converted lithium streams 130, humid gas 131, and conversion water stream 138 form a second water loop 152 that circulates from the concentrator 112 to the conversion process 122 and the water removal process 132.

Water imported into the process 100 by way of the reagents 125 used in the conversion process 122 is a water input to the overall process 100, along with water in the brine source 102. Water of the second loop 152 can be collected in a tank to manage water inventory of the second loop 152, which receives water input from the lithium concentrate stream 114 and the reagents 125 used for the conversion process 122. If inventory of water in the second loop 152 approaches a maximum, some of the conversion water stream 138 can be combined with the lithium depleted brine 118 and routed through the heat pump 120 for thermal energy recovery or directly to environmental release (and/or impurity removal prior to environmental release) if a temperature of the conversion water stream 138 is acceptable.

Because the process 100 maximizes use of energy derived from the energy source 128 through maximum recovery of thermal energy from hot exhaust and streams heated by other energy output, thermal energy flow to the environment by operation of the process 100 can be minimized. Each major sub-process of the process 100 has a thermal energy recovery unit to maximize energy efficiency. For the sorption/desorption process 104, the thermal energy recovery unit is the heat pump 120, while for the conversion process 122, the thermal energy recovery unit is the exchanger 126. Where energy use is designed and managed throughout the process 100, a single energy source 128 can provide all necessary energy for the process 100 in a flexible way. Energy sources additional to the energy source 128 can also be used in the process 100.

Generally, according to the methods herein, a lithium extraction process is chosen in a particular instance for its ability to minimize the environmental impact, both in terms of land use/damage and water use. The physical plant design is carefully evaluated to define its energy and chemical use and minimize waste streams. Each energy use is evaluated to determine the best driving source, and synergies with other areas of the process are located and exploited. The environmental impact of the processes, water intake and output, waste and disposal of waste, such as hazardous and non-hazardous solids and liquid waste, and air emissions of gases such as $CO_2$, $NO_x$, and $SO_x$ are considered and used in the calculation of the total cost of ownership of the plant over its lifespan.

As part of this process, the tradeoff between direct thermal energy (e.g. thermal energy), electrical/thermal cogeneration, and remote thermal-electrical generation is evaluated so that its impact on the full total cost of ownership (TCO) can be understood and selected. In general, non-combustion processes for electrical energy delivery are more effective and less burdensome to the environment. Direct thermal energy application (such as fired heaters) offers some advantage in terms of converting the fuel energy into process energy vs simple cycle generation, and can provide advantages even compared to combined cycle generation. For example, an efficient gas turbine plant with topping cycle(s) can deliver approximately 70% of the fuel energy as electrical energy. Simple cycle generation (like diesel engines) deliver around 50% of the fuel energy as electrical energy, and application of the electrical energy is subject to efficiency losses. However, commonly available gas fired home heaters can deliver in excess of 95% of the fuel energy as home heating. Similar results can be obtained in process applications, though the maximum efficiency typically falls as the process temperature rises.

Where work energy is needed in the process, energy must be delivered in electrical or mechanical form to accomplish the work (for example pumping or compression). Work energy represents an organized form of energy that can move mass in an organized way, so energy needed for work must be appropriately organized. Thermal energy for heating, however, is a disorganized form of energy that can be obtained from any source, including outputs of work application processes. Delivery of work energy is, accordingly, less efficient because some energy is required to achieve the organization required to deliver work. Thus, energy delivery for a lithium recovery process can be targeted to sources that deliver the kind of energy needed, and less efficient forms can be minimized.

The process energy budget for a lithium recovery process combines four general types of energy delivery, electrical energy, mechanical energy, thermal energy, and heat rejection or waste heat. Electrical energy is generally selected and delivered only where electrical energy is the only energy form that can be used. Where another type of energy can do the job, electrical energy delivery is mostly avoided due to expense of procuring and operating equipment and due to low efficiency of such energy delivery forms. Mechanical energy is generally selected and delivered where mechanical work is needed, for example in activities such as pumping and compression. Thermal energy is generally needed where thermodynamic state of a material must change in some way. These energy forms can be interchanged, for example thermal energy can be upgraded to mechanical energy and mechanical energy can be upgraded to electrical energy, at the cost of significant losses so such measures are minimized in energy efficient designs.

Selection of technologies for energy generation are made, additionally, based on environmental impact. For example, while direct fired sources of thermal energy may be very efficient at delivering thermal energy, they also emit carbon to the environment. Non-emissive generation is more expensive, and is generally less efficient at converting an energy source to a useful form (i.e. thermal, mechanical energy). In general, the form of energy needed at the point of application is paired with a generation method that minimizes cost and environmental impact, and points of application can be grouped where a suitable co-generation or multi-generation solution is available.

Figure 2:
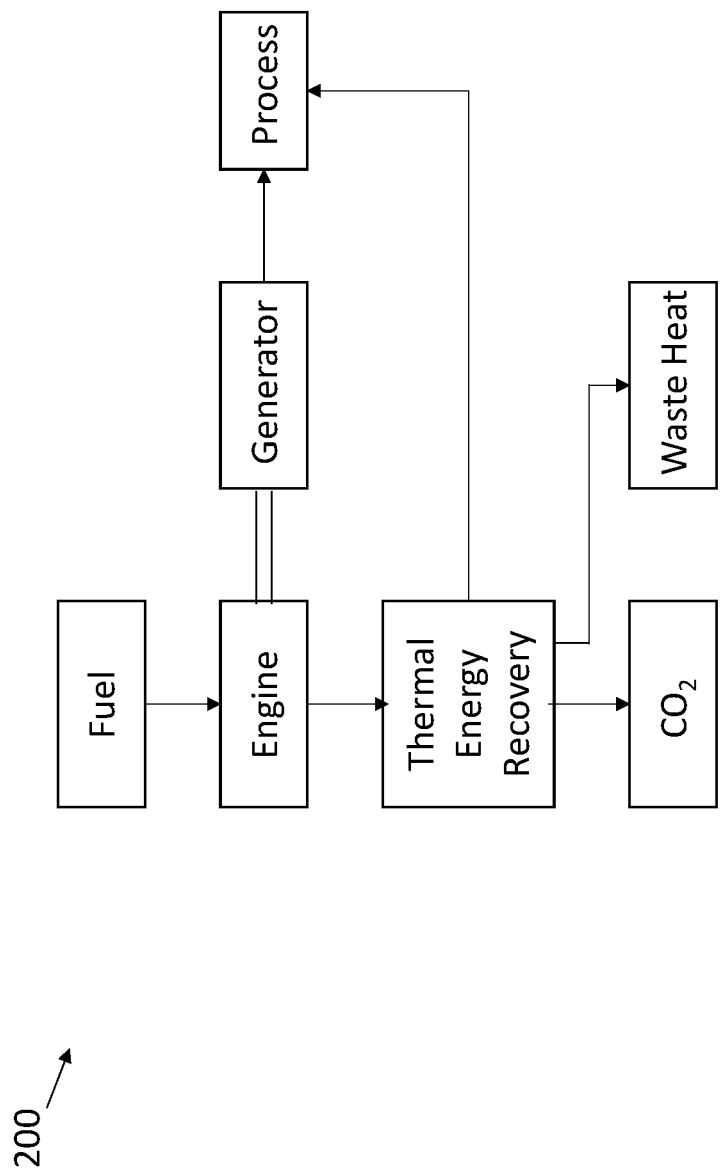
FIG. 2 is an energy flow diagram illustrating general concepts of energy flow in process applications.

In some cases, moving the electrical generation point from a remote location to the process plant can provide some advantages in that a primary cycle can produce electrical power for the plant needs and then the thermal energy from generation is directly applied to process heating. As examples, gas turbines and diesel engines offer exhaust at high temperatures which can be tapped into to recover thermal energy. Diesel engines can also provide thermal energy at multiple temperatures by using intercoolers, jacket cooling and oil cooling. FIG. 2 is an energy flow diagram 200 illustrating general concepts of energy flow in process applications.

Thermal energy is generally routed selectively from the most economical source to different sub-systems in the plant based on operational conditions. During plant design, special consideration is given to start-up due to starting from cold and the fact that process heat is not available to recover, so energy sources are provided that can be used to provide extra energy, in required forms, for plant start-up. Multiple thermal levels in the sub-systems of the plant (different low temperature and high temperature settings for different units) allow for efficient heat exchange using counterflow heat exchangers or other thermal management means.

Figure 3:
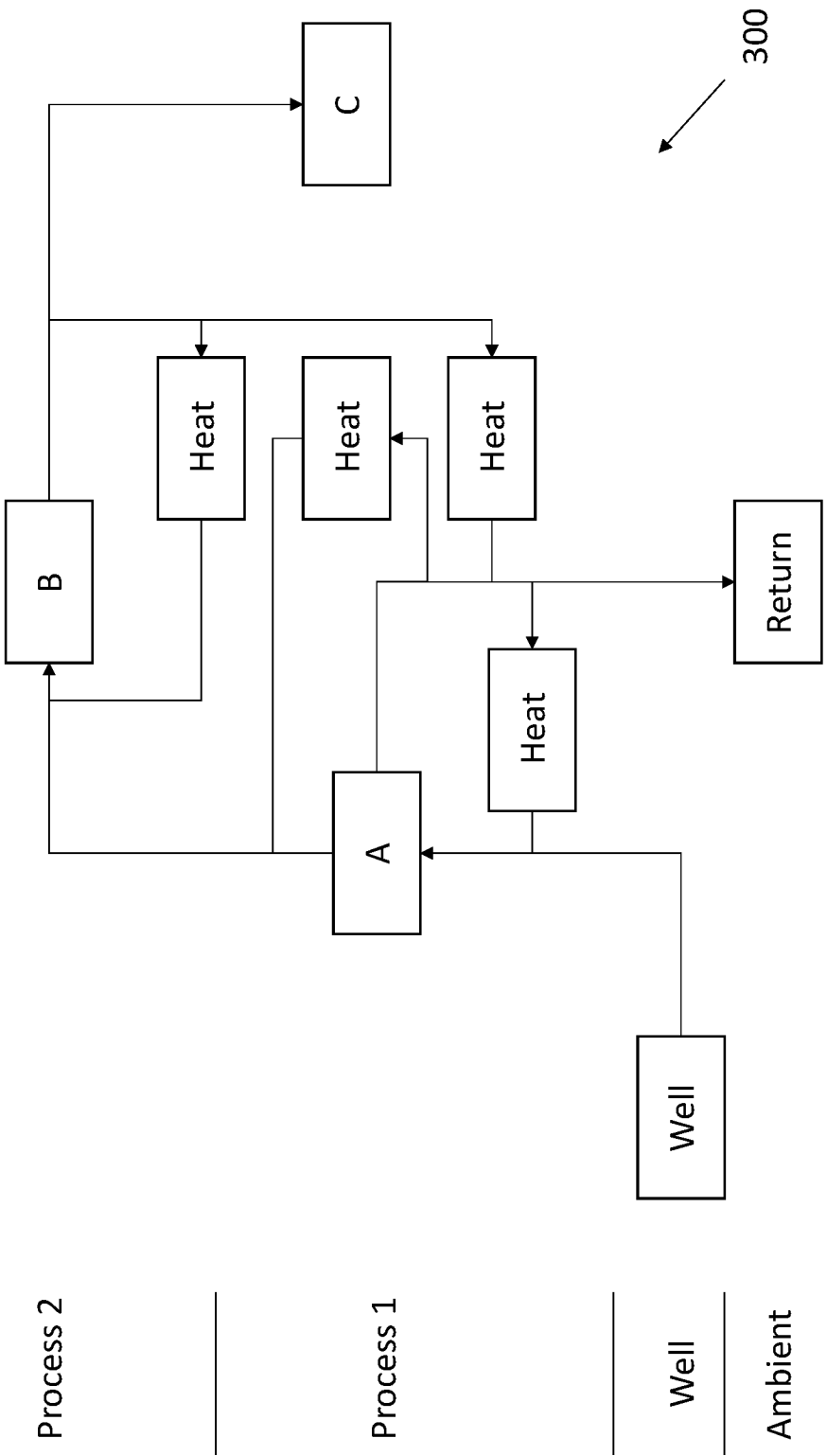
FIG. 3 is a heat flow diagram generally illustrating heat integration in a lithium recovery process.

An important area where TCO calculation impacts plant design is heating. In typical plant design the low first cost and moderate operating expense of direct fired heating is prioritized. However, applying heat pump technology can deliver radically higher value, in terms of total installation and operating cost, at somewhat elevated capital expense. For example, where a moderate temperature differential exists between source fluid and process, 1 kW of electrical power can in some cases be leveraged to deliver 9 kW of process heat. As the difference between source and process increases the multiplier generally falls, but can still be 2 or more even with relatively high temperatures. In the present process, brine that is stripped of lithium can be exploited as the low, or energy supply, side of a heat pump. Residual energy after recuperation will further enhance its ability to provide source energy. FIG. 3 is a heat flow diagram 300 illustrating these concepts.

The use of a simple heat exchanger can be effective where thermal energy differences are large enough to provide effective thermal transfer. Where the density of thermal energy between two materials is so small that the rate of thermal energy transfer between the two materials would be unacceptably slow, a heat pump can be used to apply work energy to adjust the thermal energy density of one or both materials to increase the rate of thermal energy transfer. At least some of the work energy delivered by the heat pump is typically also transferred into thermal energy of the medium. Efficiency criteria can be employed to determine when to use a heat pump, for example where the work energy invested in the heat pump yields an acceptable rate return in thermal transfer. A coefficient of performance ("COP") defined as watts of electrical power consumed divided by watts of thermal transfer provided, can be used for such purposes. For example, at lower temperatures, some heat pumps can achieve a COP as high as 14, while at temperatures near the boiling point of water the COP might be as low as 2-3.

A further improvement to the application of heat pumping technology is to apply absorption/desorption processes (such as ammonia cycle) that can apply thermal energy directly to the cycle rather than using purely electrical power for heat pumping. Heat pumps incorporating turboexpanders to improve cycle efficiency (by half a point of COP or more) offer higher value in high powered applications and are much more attractive than simple thermal expansion valve cycles at large scales. Such devices replace the thermal expansion valve or orifice with a turbo machine to produce isentropic expansion and shaft work. The other end of the shaft is normally coupled to a compressor wheel to use the shaft work for compressing refrigerant, or to an alternator to directly convert the shaft work to electricity without the need for a seal between the two sides. Piston based devices are also usable for capturing the expansion work. A further boost in system efficiency, especially using $CO_2$ as a green refrigerant, can be obtained through use of a pressure exchanger type device that acts as a combined expansion device and pumping device. Investment in heat recuperators typically offers attractive return; small capital investments can move large amounts of energy from fluids exiting processes and return it to incoming fluids.

Figure 4B:
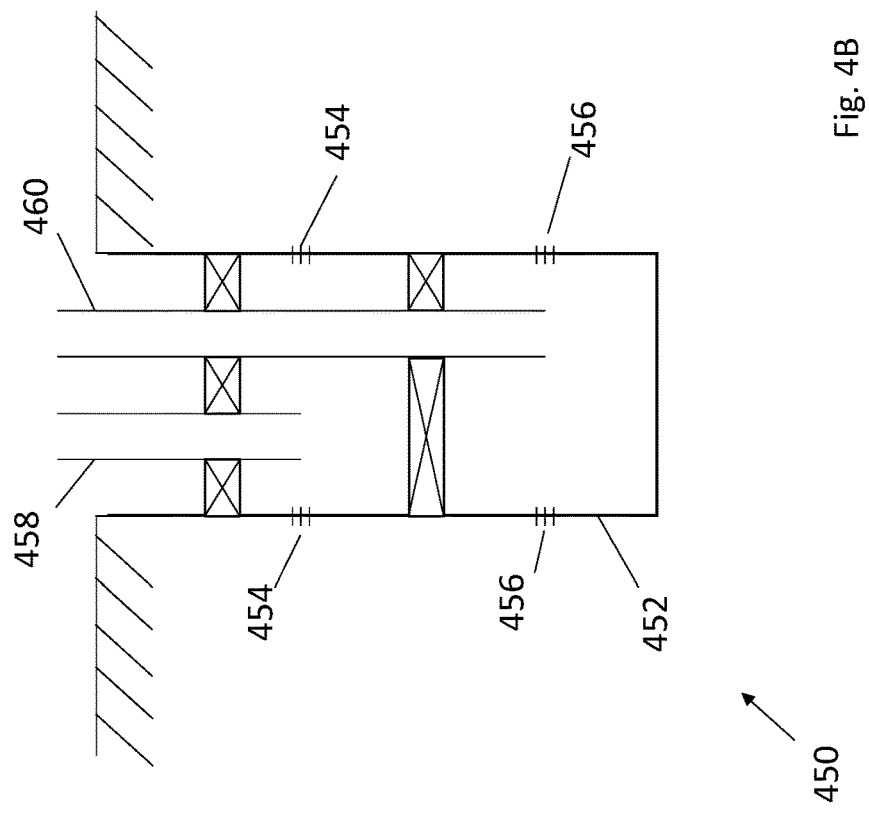
FIGS. 4A, 4B, and 4C are activity diagrams illustrating lithium brine recovery activities according to two embodiments.
Figure 4A:
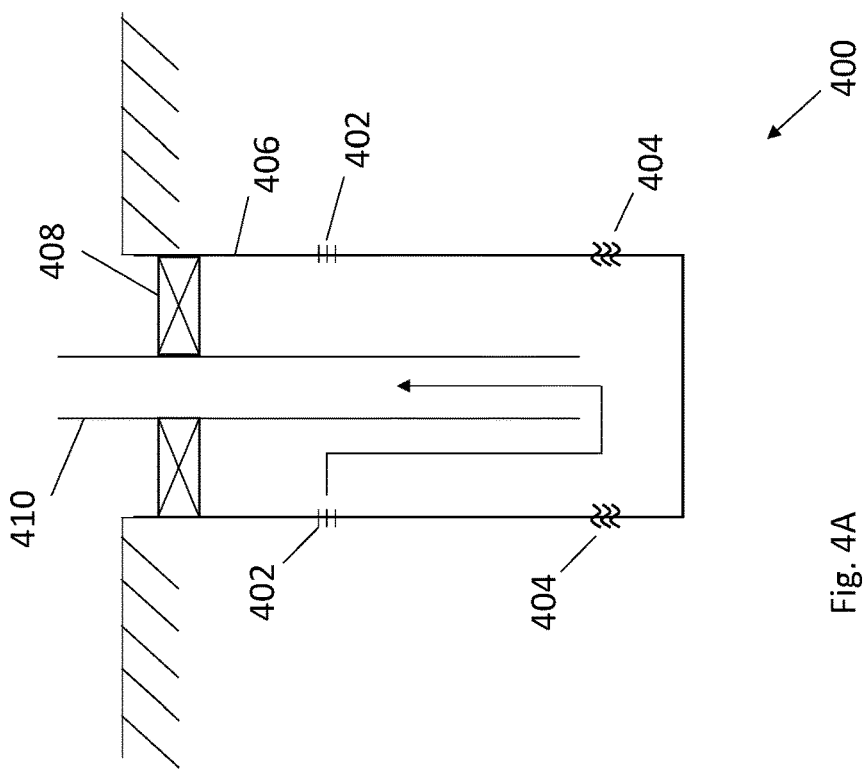

Regarding brine sources, brine well depths may be chosen not just for the lithium concentration vs depth, but also temperature vs depth. FIG. 4A is an activity diagram 400 illustrating a lithium brine recovery activity according to one embodiment. Here, a brine source 402 is at a first subterranean depth while a thermal source 404 is at a second, deeper, subterranean depth. A well 406 is extended through the brine source 402 to at least the thermal source 404, and an annulus 408 is disposed in the well 406. A wellstring 410 is extended through the annulus 408 to at least the second subterranean depth. Lithium containing brine from the brine source 402 is forced to flow down to the thermal source 404 to obtain thermal energy before flowing into the wellstring 410 and up to the surface. Thus, a deeper well's cost may be offset by the delivery of brine at temperatures more appropriate for process applications and/or process energy generation. Geothermal energy can be used to heat a subterranean lithium brine source for processing by flowing the lithium brine to, through, or near a thermal source before flowing the lithium brine to enter a production wellstring. The thermal source may be a fluid that occurs naturally in the formation or the thermal source may just be hot solids like rocks and sand that can be used to heat a thermal medium pumped into the formation for direct thermal contact or using a heat exchange apparatus.

In one example, accessing brines at a depth of 800 feet or below can be expected to provide brines at a temperature of 25-30° C., while accessing brines down to 3,100 feet of depth can yield brines at a temperature of 50° C. Such brines would not need as much heating prior to lithium recovery, and potentially none at all, trading capital investment in heat delivery to feed streams for potentially less investment in feed stream acquisition at greater depths. Additionally, cooler surface brines can be used for heat recovery in a lithium recovery process prior to being subjected to extraction.

Dual completion wells where one zone is designed for lithium production and a deeper zone is designed for geothermal energy production are likely to provide significant value. FIG. 4B is an activity diagram 450 illustrating a lithium brine recovery activity according to another embodiment. Here, a well 452 is drilled past a first brine source 454 at a first subterranean depth to at least a second brine source 456 at a second, deeper, subterranean depth. A first wellstring 458 is extended into the well 452 to the first subterranean depth, while a second wellstring 460 is extended into the well 452 to the second subterranean depth. The two wellstrings 458 and 460 can simultaneously lift lithium containing brine from the two brine sources 454 and 456 using a single well 452 while providing brines at two different temperatures.

The direct application of geothermal energy to a lithium recovery process is expected to be valuable, as the process has significant needs for moderate temperature energy. Such moderate temperature geothermal energy may be difficult to convert to electrical energy but easy to apply directly. Organic Rankine cycles ("ORC") in combination with the process above can be useful. Geothermal energy can be used to supplement the energy needs of a lithium recovery facility using other energy sources as well. For example, in the facility of FIG. 1, where the energy source 128 provides energy of many types to the facility, the need for thermal energy, geothermal energy from the brine source 102 can be combined with energy from the energy source 128 in the heater 106, or if the brine source 102 is warm enough, the heater 106 can be omitted from the process. In any event, geothermal energy can be combined with other targeted energy delivery methods in a lithium recovery facility.

Solar energy harvesting also offers significant opportunity. Commercially available solar panels with integrated heat exchangers can offer direct heating of source brine and/or an intervening fluid. Such a combination delivers electrical power and improves the efficiency of the solar panels by lowering their temperature. Concentrated solar can deliver two potential routes to application. One is to apply direct solar heating to either source brine or an intervening heat transfer fluid. Solar collector installations that use a distributed array of mirrors to concentrate solar radiation to a small area where a thermal medium such as molten salt can absorb thermal energy from the solar radiation can be used as a convenient source of multiple forms of energy. For example, such installations commonly generate electricity using cycle generators such as steam loops to drive turbines. The steam and/or the thermal medium can also be used to supply thermal energy directly to streams of a lithium recovery facility.

Alternative solar technologies exist that deliver both electrical power and thermal power by application of a specialized high flux solar cell with active heat transfer to capture the thermal energy. One such technology is the RayGen solar system available from RayGen Resources Pty. Ltd. of Victoria, Australia. The RayGen system uses a thermal transfer medium to capture thermal energy from photovoltaic panels by conduction, convection, and phase change, maintaining temperature of the photovoltaic panels in a desired range for conversion efficiency and deliver thermal energy as well. Both such processes can deliver solar thermal storage and leveled energy delivery over one or more days.

Since lithium recovery has significant demand for process heat, using phase change materials to store heat for use while transient generation systems are off line (such as solar and wind) can provide advantages in enabling 24 hour operation, plant simplification, and minimizing energy conversion losses. Additionally, process tanks may be exploited as non-phase-change energy storage devices. Such storage has the advantage that high temperature stored fluid can be mixed with lower temperature fluids to produce desired temperatures directly. Storing energy during periods of low demand and consuming during peak load conditions can allow variation in thermal requirements during day and night. Energy storage at site can be provided in compact batteries and other storage means such as gravitational, hydro, compressed gas, and thermal storage, and excess energy generated can be pushed back to the grid to monetize from this operation.

Reverse osmosis processes applied to lithium brine recovery processes also benefit from the application of energy recovery devices (such as ERI or Energy Recover Incorporated's Pressure eXchanger). Such devices act to recover the pressure energy contained in the brine at high pressure, where such brine needs to be transitioned to low pressure to avoid accumulation of salts in the high pressure fluid or other similar objectives.

In general, crystallization of dissolved solids is accomplished herein by heat pumping. Such processes normally have both an evaporation and a condensation area. A heat pump operating between these two areas can offer higher efficiency than would be achievable working against ambient temperature. Further, a heat pump configured to utilize the lithium depleted brine stream 118 and/or other process streams to recover thermal energy into the crystallization process can offer even higher COP. Multi evaporator and or multi-loop/multi stage heat pumps can take better advantage of multiple thermal levels.

Figure 4C:
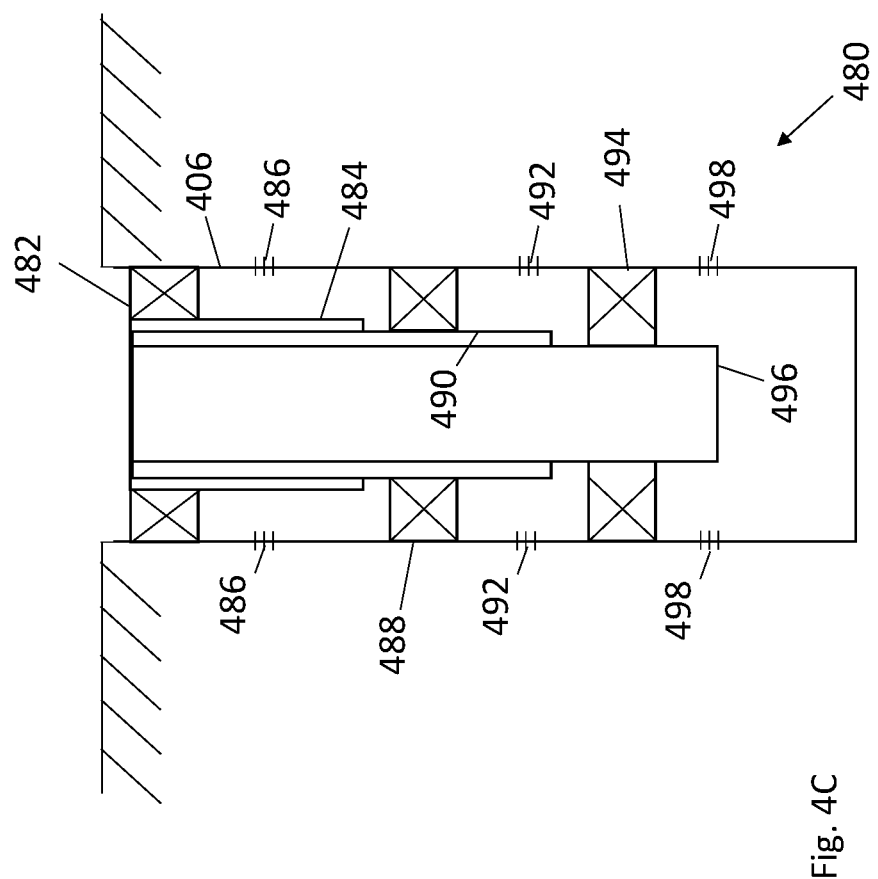

FIG. 4C is an activity diagram 480 illustrating a lithium brine recovery activity according to one embodiment. In this embodiment, progressive annular isolation is used along with nested tubing to provide access to lithium sources at different depths in a formation. A first annular isolator 482 is installed at or near the surface and a first tube 484 is disposed through the annular isolator 482 to access a first lithium source 486 at a first depth. Below the end of the first tube 484, a second annular isolator 488 is positioned. The second annular isolator 488 has a central opening with a diameter less than the diameter of the first annular isolator 482 and the first tube 484. A second tube 490 is disposed through the second annular isolator 488 to access a second lithium source 492 at a second depth. Below the end of the second tube 490, a third annular isolator 494 is positioned. The third annular isolator 494 has a central opening with a diameter less than the diameter of the second annular isolator 488 and the second tube 490. A third tube 496 is disposed through the third annular isolator 494 to access a third lithium source 498 at a third depth. Any reasonable number of isolation stages and nested tubes can be used in this manner to access lithium sources at different depths and different temperatures. Flow control devices known in the prospecting industry can be used to select and control flow of brines from different depths of the formation to adjust overall composition of brine extracted from the formation and to adjust energy profile of the brines extracted from the formation.

Figure 5:
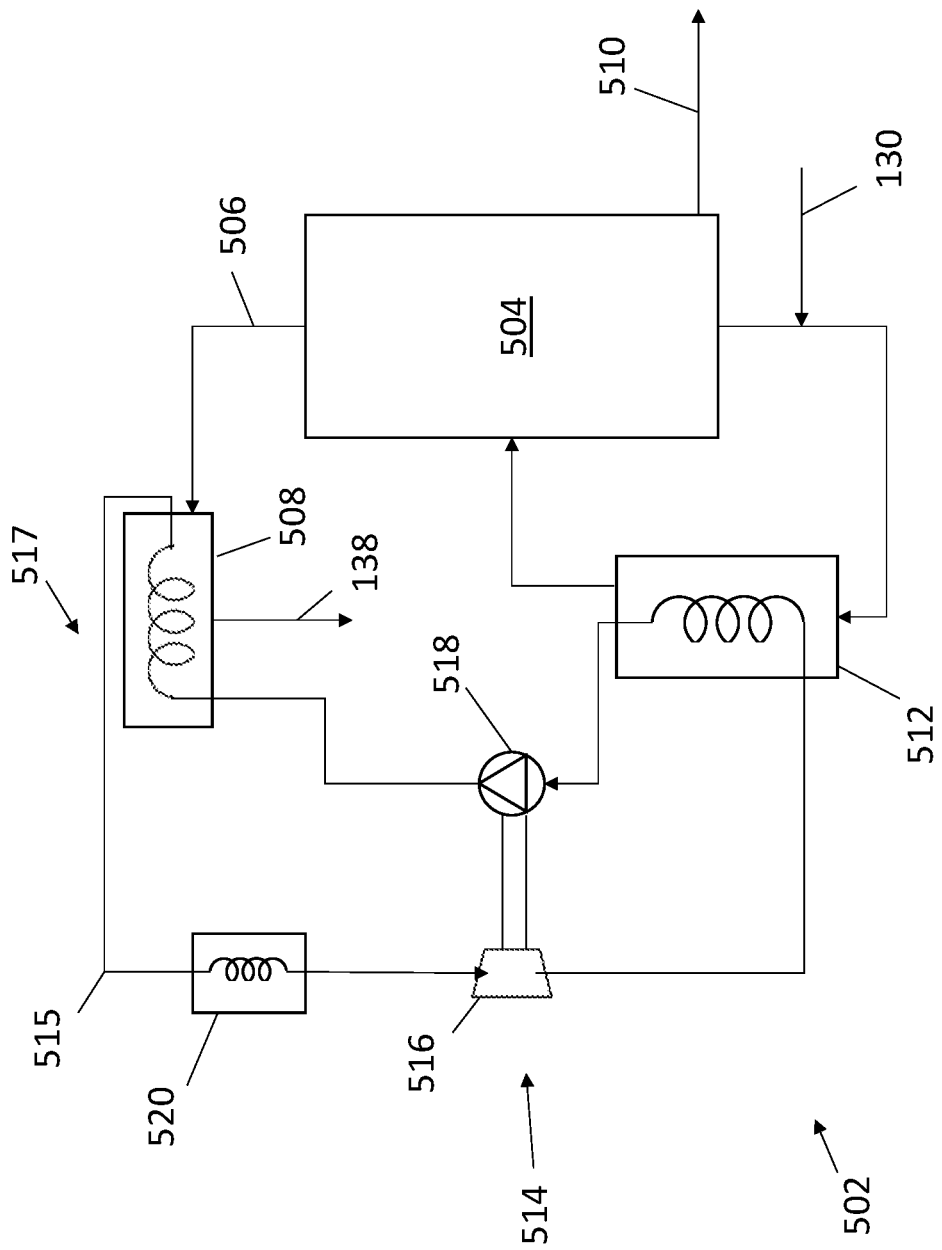
FIG. 5 is a process diagram showing a vaporizer/condenser unit 502 that can be used with the conversion process of FIG. 1.

FIG. 5 is a process diagram showing a vaporizer/condenser unit 502 that can be used with the conversion process 122 of FIG. 1. A vaporizer 504 is used to vaporize water from a converted lithium stream 130 to an overhead 506, which routes water vapor to a condenser 508. Lithium is concentrated in a lower portion of the vaporizer 504, and a lithium product 510, which may be the lithium product 124 of FIG. 1, is withdrawn at the lower portion of the vaporizer 504. The concentrated lithium fluid flows out the bottom of the vaporizer 504 and is mixed with the converted lithium stream 130. The mixture is routed to a heating unit 512, which returns a heated aqueous lithium stream to the vaporizer 504.

A turboexpander/compressor unit 514 is used to drive a thermal medium 515 in a heat pump loop 517 to heat the mixture and cool the water vapor. The thermal medium is compressed using the compressor 516 of the turboexpander/compressor unit 514, raising a temperature of the thermal medium to a heating temperature. The heated thermal medium is flowed through the heating unit 512, transferring heat to the mixture in the heating unit 512, cooling the thermal medium. The thermal medium is then flowed through the turboexpander 518 of the turboexpanders/compressor unit 514, reducing the pressure of, and cooling, the thermal medium. The cooled thermal medium is flowed through the condenser 508, cooling and condensing the water vapor to form the conversion water stream 138, and reheating the thermal medium. The reheated thermal medium is then routed through a heater 520 to replace energy lost in the thermodynamic process of the heat pump, and then back to the turboexpander side of the turboexpanders/compressor unit 514. Thermal energy for the heater 520 can be obtained from the energy source 128, or another energy source.

In geothermal energy usage, the sub surface fluid motion produced by geothermal generation may be shaped to improve lithium collection downhole by adding bulk motion. In the case where the higher temperature formation carries lithium, such brine may be circulated through the plant process for extraction in addition to other, richer formation brine that is the primary stream of the plant.

Thermal effects of injection can also be used to improve results. Injection wells can be positioned in a reservoir so that different water streams at different temperatures can be selectively injected at different locations to create a desired thermal profile within a formation. Streams can be injected into a formation also for the purpose of merely storing thermal energy in the reservoir, which can also be extracted using thermal exchange means. Reservoir modeling can be used to understand the thermal effects of injecting streams of different volumes at different temperatures and locations and to optimize the effects. Judicious addition of heat to a lithium source formation can improve recovery ratio of lithium in the produced brines and can also improve flow within the formation by reducing viscosity and moving brines away from their saturation points. Moving brines away from their saturation points can reduce the potential for formation of flow-blocking salt deposits within the formation. For saturated salt deposits higher temperature brines can also mobilize more lithium.

Combined with injection strategies, lithium recovery facilities with thermal components included in the return stream preparation equipment can also adjust thermal properties of returned streams as part of an overall thermal management system for the reservoir/brine lift/lithium extraction operation. Sensors and control system, coupled with dynamically scalable modular thermal exchange systems can automatically adjust thermal contact between various streams to direct thermal energy from selected sources to selected destinations based on models and artificial intelligence systems.

For example, the energy source 128 of the lithium recovery facility of FIG. 1 may have a plurality of dynamically selectable and/or scalable energy generation units, such as photovoltaic units, solar electro-thermal units, diesel-electric generators, fired or electrically heated boilers, to deliver energy in selectable and scalable forms for the lithium recovery facility. Energy output of the energy source 128 can thus be scaled and/or smoothed with the day-night cycle. During the day, excess electricity from solar generation can be used in a heat pump to deliver process heat, used for resistance process heating, or used for increasing stored energy, for example within the lithium source itself, by resistance heating or using a heat pump. During the night, stored thermal energy can be recovered and converted to electricity to power operations or directly used for thermal exchange heating. The energy source 128 can also be connected to local energy grids to benefit from market prices for power when attractive. In this way, wherein the energy source 128 actually includes more than one generation facility, a modular approach allows selectability and scalability to supply power needs for lithium recovery effectively and efficiently.

Selectability and scalability can be automated using digital control equipment coupled to components of the energy source 128 and/or flow control equipment to control flow of thermal media and fuels to and from components of the energy source 128. Intelligent control systems can be configured to select energy generation patterns based on the kind of energy needed (mechanical, electrical, thermal) and conditions of the environment such as thermal condition of the lithium source and weather (ambient temperature, precipitation, insolation). Such control systems can have models of the lithium recovery facility, or components thereof, that can be driven using the sensed thermal conditions of the lithium source and the environment. The models can resolve energy quantity and type needs of specific components that can be used to control energy generation by the selectable components of the energy source 128, transformation of the energy as needed, and delivery of the energy to components of the lithium recovery facility where the energy is needed.

Efficiency of adsorption-desorption and chemical reactions, and reliability of materials used, in the lithium extraction process plant are sensitive to temperature. Understanding the sensitivity of the variables such as brine composition, flow rates, bed volumes, and temperatures on the performance, efficiency, reliability and cost of the process is typically accomplished using multi-physics modeling and simulation. Such models are designed for mass and energy balance as well as kinetic and thermodynamic transients to suggest optimum set points that can achieve minimal total cost. Such models can be used, for example, to define an operating temperature to optimize performance and economics. These operating temperatures can be used as set points during start-up and steady state operation.

While the foregoing is directed to embodiments of the present invention, other and further embodiments of the present disclosure may be devised without departing from the basic scope thereof, and the scope thereof is determined by the claims that follow.

We claim:

1. A method of recovering lithium from a brine source, comprising:
    extracting lithium from the brine source using a sorption/desorption process to form a lithium extract;
    providing electricity for the extracting using an energy source; and
    recovering thermal energy from the energy source for use in the extracting;
    storing recovered thermal energy within the brine source.

2. The method of claim 1, wherein extracting lithium from the brine source yields a lithium depleted brine, and the lithium depleted brine is used to inject the thermal energy into the brine source for storage.

3. The method of claim 1, wherein providing energy for the extracting and the converting uses a single energy source.

4. The method of claim 1, further comprising recovering thermal energy resulting from use of the electricity provided by the energy source for use in the extracting.

5. The method of claim 4, wherein recovering thermal energy from use of the electricity provided by the energy source includes recovering heat from one or more streams resulting from the extracting using a heat pump, a heat exchanger, or both.

6. The method of claim 4, further comprising converting lithium from the lithium extract to a hydrated lithium salt using a conversion process, providing electricity from the energy source for use in the conversion process, and using the thermal energy recovered from the energy source in the conversion process.

7. The method of claim 6, further comprising monitoring one or more parameters of one or more streams of the sorption/desorption process, the conversion process, or both, using sensors and adjusting the recovering thermal energy based on the monitoring.

8. The method of claim 1, wherein the energy source is a photovoltaic source or a cycle generator.

9. The method of claim 1, further comprising converting the recovered thermal energy into electricity using a cycle generator.

* * * * *